No. 788,949. PATENTED MAY 2, 1905.
FITZ WILLIAM SARGENT.
BRAKE SHOE.
APPLICATION FILED FEB. 8, 1904.

Witnesses:
Lindsay deB. Little
F. W. H. Clay

Inventor,
Fitz William Sargent
by Paul Synnestvedt
atty

No. 788,949. PATENTED MAY 2, 1905.
FITZ WILLIAM SARGENT.
BRAKE SHOE.
APPLICATION FILED FEB. 8, 1904.
3 SHEETS—SHEET 2.
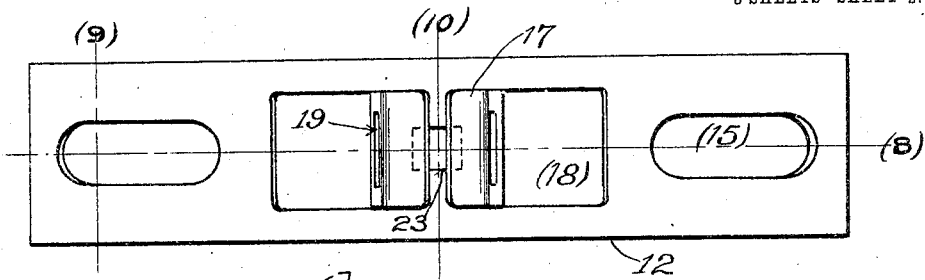
Fig. 7
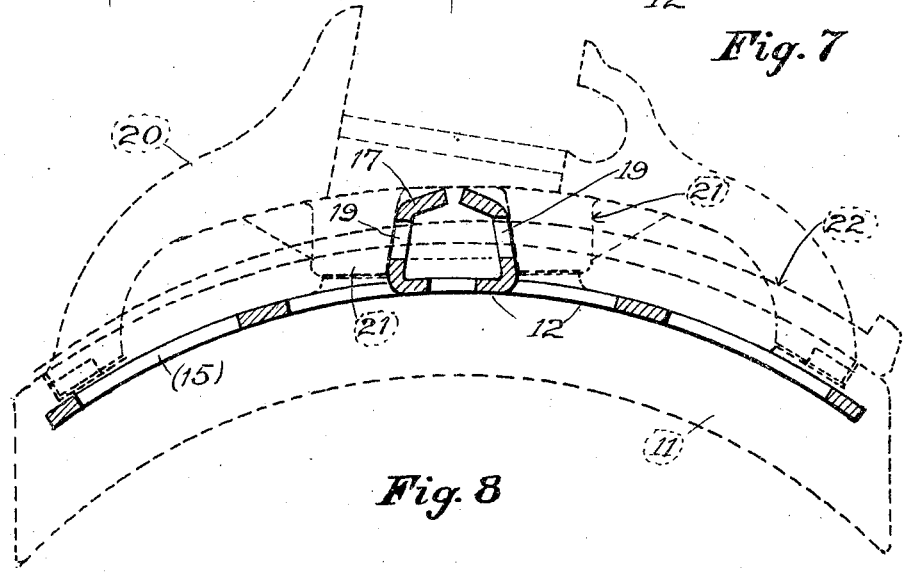
Fig. 8
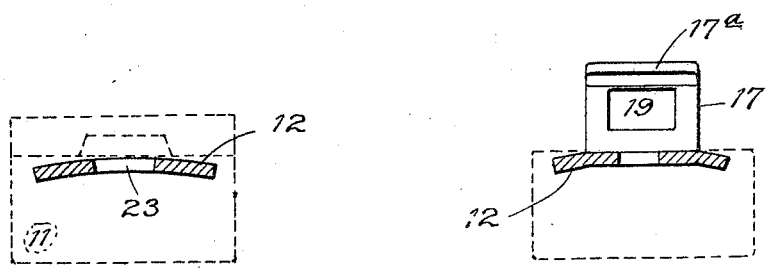
Fig. 9
Fig. 10
Witnesses;
Lindsay deB. Little
F. W. H. Clay
Inventor;
Fitz William Sargent
by Paul Synnestvedt
Atty.

No. 788,949. PATENTED MAY 2, 1905.
FITZ WILLIAM SARGENT.
BRAKE SHOE.
APPLICATION FILED FEB. 8, 1904.
3 SHEETS—SHEET 3.
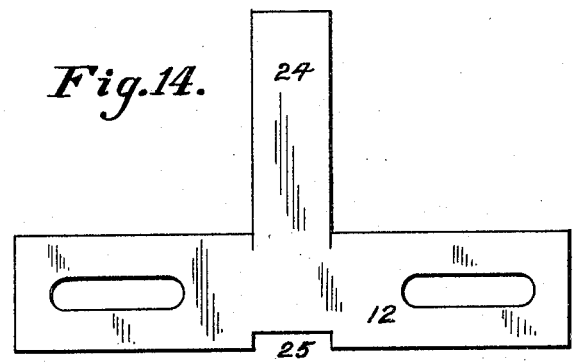
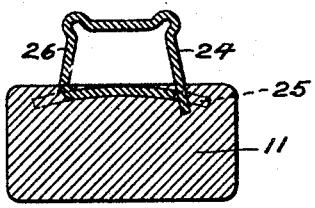
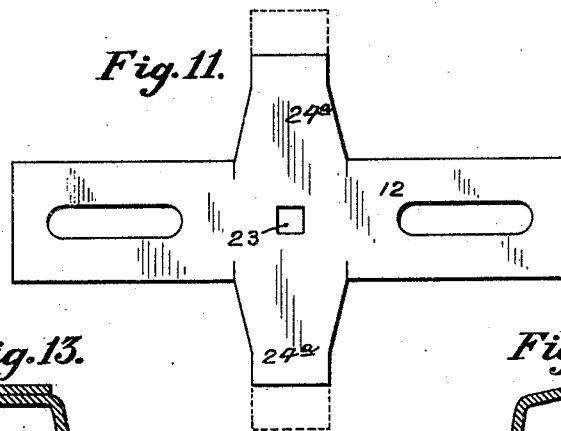
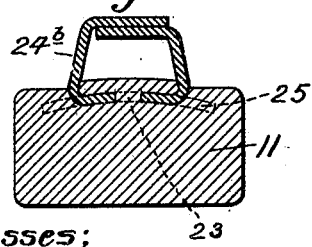
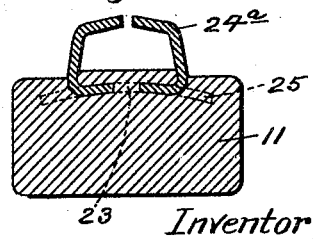
Witnesses;
Walter Samariss
Chas. H. Eberh
Inventor,
Fitz William Sargent
By Paul Synnestvedt
Attorney.

No. 788,949. Patented May 2, 1905.

UNITED STATES PATENT OFFICE.

FITZ WILLIAM SARGENT, OF MAHWAH, NEW JERSEY, ASSIGNOR TO AMERICAN BRAKE SHOE & FOUNDRY COMPANY, OF JERSEY CITY, NEW JERSEY, A CORPORATION OF NEW JERSEY.

BRAKE-SHOE.

SPECIFICATION forming part of Letters Patent No. 788,949, dated May 2, 1905.

Application filed February 8, 1904. Serial No. 192,489.

*To all whom it may concern:*

Be it known that I, FITZ WILLIAM SARGENT, a citizen of the United States, residing at Mahwah, in the county of Bergen and State of New Jersey, have invented certain new and useful Improvements in Brake-Shoes, of which the following is a specification.

My invention relates to the wearing blocks or shoes of brakes employed on railway cars and the like, and particularly to the form of brake shoe which is made of cast metal and is provided with a strengthening back generally made of plate steel or other ductile metal. The objects of the invention are, to provide a superior method of attaching such a strengthening back to a cast shoe; to provide superior lugs for attaching the shoe to the brake head, and superior means for securing the lugs in the cast metal of the shoe; to provide for making integrally the strengthening back of a cast shoe and a malleable lug for attaching said shoe to the brake head; to provide a superior form of attaching lug which will fit tight in place in the brake head and which has a secure hold upon the attaching pin or key, and to generally improve and simplify the manufacture of brake shoes of the kind specified. These objects and other advantages which will hereinafter appear, I attain by means of the structure illustrated in preferred forms in the accompanying drawings, wherein—

Figure 3:
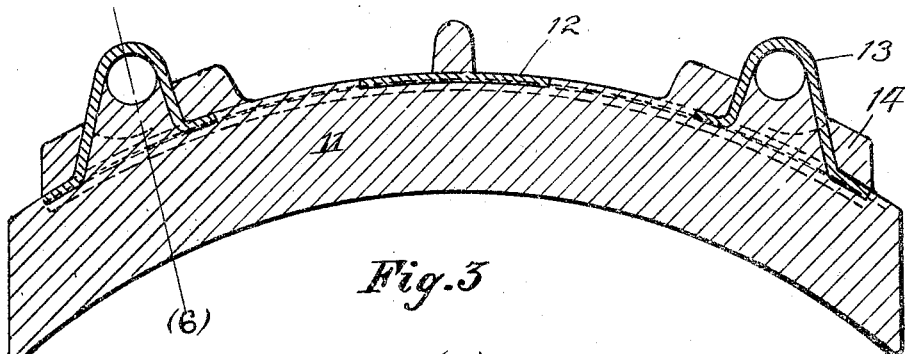
Figure 3 is a central longitudinal section on line 3 of Figure 4, of a form of brake shoe having two attaching lugs formed on the malleable backing.
Figure 4:
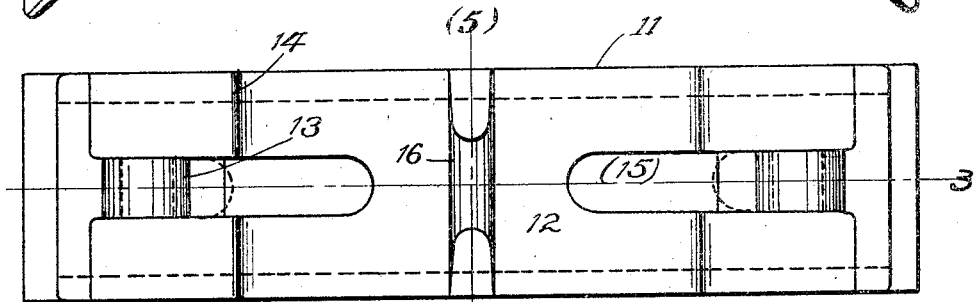
Figure 4 is a plan view of the same.
Figure 5:
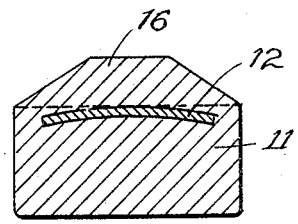
Figure 6:
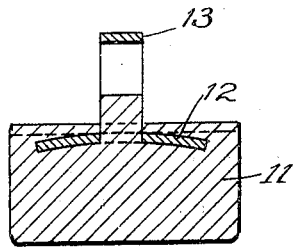

Figures 5 and 6 are cross sections of the brake shoe, taken respectively on lines 6 in Figure 3, and 5 in Figure 4;

Figure 7 is a plan view of another form of backing with an improved central attaching lug formed thereon;

Figure 8 is a central longitudinal section of the malleable backing as formed up, and the outlines of the head and the shoe shown therein;

Figures 9 and 10 are cross sections, respectively on lines 9 and 10 in Figure 7, showing the malleable metal backing, and the shoe in outline;

Figures 11 and 14 are plans of a modified form of the blank, and

Figures 12, 13 and 15 are central cross sections showing the formation of the lug, in some variations in which the straps for the lugs are bent over from the side of the backing and the eye for the key is laterally resilient.

In order to overcome the inherent weakness and danger of the ordinary cast brake shoe in heavy service, which results from the structural weakness of the cast iron body, reinforcing strips or backs formed of tough malleable iron or ductile metal have been placed lengthwise in the body of the shoe in various positions, to strengthen and to hold the parts together in the event of the body cracking when in service. In such shoes however, the attaching lugs for fixing the shoe upon the brake head have ordinarily been made of cast metal or else of separate pieces fixed in the cast metal of the shoe, being usually made integral with the cast body and projecting through or around the re-inforcing plate or strips forming the back. In such cases not only are these parts weak but the cooling effect on the cast metal at the point where it passes around or through the apertures of the plate or re-inforcing back has caused a chilling of the cast metal which increases the shrinking and danger of cracking the same, so that so far as the lugs are concerned the cast lugs are weaker than if the shoe did not have the malleable backing. In those cases where a malleable back has been used and doubled upon itself near the center of the shoe to form the eye lug for attachment to the head, it results in weakening the shoe at the center where the greatest strain comes upon it and is furthermore more expensive in using more metal than necessary and fails to support the shoe at the center in case of cracking.

Figure 1:
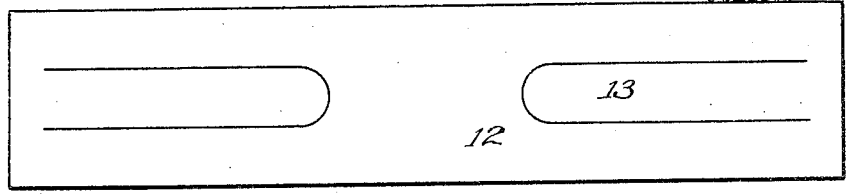
Figure 1 is a plan view of the blank for making the malleable backing of the shoe, being cut ready for punching up the lug thereon.
Figure 2:
Figure 2 is a side elevation of the same showing in two stages the formation of the malleable lug made from the backing plate.

In order to overcome these difficulties I provide a brake shoe which consists of a cast body re-inforced by a plate of malleable or ductile metal on the back and the attaching lugs are formed by punching up a part of the metal of such back, thereby at the same time providing the lug and an opening through which the cast metal may flow to firmly fix the backing upon the body. The lug is thus an integral part of the backing itself. As shown in the figures on Sheet 1 of the drawings, the malleable or ductile back 12, which is preferably made of steel, has the tongues 13 punched out as shown in Figures 1 and 2 and bent upward in the form shown in Figure 3, whereupon the said back is placed in the mold and cast metal for the body is poured in, when it will be seen that the cast metal may freely pass through the openings (15) in the back and also around the ends of the plate and in the openings under the straps 13 to form the seats 14 for the brake head, and also to form the central ridge 16. I preferably form the backing with a curved section as shown in Figures 5 and 6, thereby increasing the strength of the back and giving the outer edges more firm anchorage in the metal of the cast body, 11. It will be seen that in the completed shoe both ends of the loop 13 forming the eye for attachment to the brake head are buried deeply under the cast metal of the seat 14, and besides, the strap 13 is an integral part of the backing plate 12 and consequently will hold the pieces of the shoe together in case of breakage of the cast metal, and cannot itself come loose from any part.

In the figures on Sheet 2 I have shown a different form of the backing for shoes, in which there is used a center lug. In this it will be seen that the back 12 is punched with two end openings 15 for the flow of the cast metal therethrough, and the central attaching-lug is made by punching out two lips 17 and bending them up in the form shown clearly in Figure 8. A central opening 23 may also be punched in order to give a more secure hold upon the cast body, and the backing may be made either flat or in the curved form as shown in Figures 9 and 10. It will be seen that these two upward bent lips 17 are provided with openings 19 for the reception of brake shoe key 22 when placed in the head 20 of the brake beam, and by reason of the formation of the two sides 17 of the lugs so that they incline with respect to each other it will be seen that the lugs may be sprung and forced in to fit tightly and maintain by their resiliency a tight fit within the two side lugs 21 of the brake head, while at the same time the top or overhanging edges 17ᵃ of the sides 17 may abut against the base of the seating notch and here again may insure by their resilience the lugs remaining tightly in place in the brake head and on the key 22. I regard this as a very important advantage not only because it gives a firm hold of the lugs upon the brake shoe key but because it entirely obviates the rattling of the shoe on its seat either vertically or laterally upon the brake head.

It will be understood of course that when so desired the cast metal of the body 11 may be run entirely over and around the plate 12 connecting with the parts that run through the openings 15 and 23, so that while the lug is integral with the back of the shoe it does not in any respect interfere with the anchorage of the said backing within the shoe, and no part of the shoe can fall out in case of breakage. Two lugs in position as in Figure 3 may of course be made in the form of Figure 8 when so desired. And it will be understood that the improvement of the double strap lug as shown in Figure 8 may be applied as well to a flange brake shoe or any other form of shoe; and this feature may be combined with the feature of elasticity in the size of the attaching lug in order to fit in the notch in the brake head, whatever the form of shoe may be. Also, by the form of the two-part resilient lug 17, in the act of driving the key into place the sides may vary in their inclination and in the form of the opening therein to accommodate the key as well as the notch into which the attaching lug is inserted. The construction of the lug may be varied by forming a strap or pair of straps bent over from the side of the backing as shown on Sheet 3 of the drawings. Thus in Figure 11 the blank is provided with laterally projecting straps 24ᵃ which when bent over form the lug as in Figure 12; or the two parts may be lapped over each other as in Figure 13. The cut is preferably made deep enough to form recesses 25, when the straps are bent up. The blank in Figure 14 has a a single long strap, 24, which is bent over as in Figure 15 with the end lying in the cut out notch 25 therein, making the complete lug 26 with both ends anchored. In all the forms the lug is integral with the back and is resilient. The various advantages of these devices will be readily apparent.

Having thus described my invention and illustrated its use, what I claim as new, and desire to secure by Letters Patent, is the following:

1. A brake shoe having a resilient compressible attaching lug thereon.

2. A brake shoe having a resilient attaching lug formed in two unconnected parts.

3. A brake shoe having an attaching lug whose sides are inclined, free at one end, and laterally resilient.

4. A brake shoe having an attaching lug with its sides and top formed of resilient free-ended members.

5. A brake shoe having a two part attaching lug composed of two projecting unconnected spurs and resilient both laterally and vertically to the brake head, substantially as described.

6. A brake shoe having a malleable metal backing and a resilient attaching lug with compressible sides.

7. A cast brake shoe provided with a malleable strengthening back, and said back having integral therewith a resilient attaching lug composed of two separate parts.

8. A brake shoe having an attaching lug composed of two perforated members having free ends, substantially as described.

9. A strengthening back for brake shoes comprising a continuous plate of malleable metal having attaching lugs for the shoe formed by punching out parts of said metal.

10. A malleable plate backing for brake shoes having thereon an attaching lug for the brake shoe formed of lips punched out of said metal and bent up and provided with means for resiliently engaging the brake head.

11. A brake shoe back comprising a plate of ductile metal having lips punched out of the same and bent upward to form a resilient attaching lug, and having their ends free.

12. A brake shoe comprising a cast body, a ductile metal backing embedded in said body, and parts of said backing being punched out and bent upward to form attaching lugs, the bases of said punched-out lips being buried in the cast body of the shoe and the upper ends free.

13. A brake shoe comprising a cast body and a malleable backing, said backing having free-ended tongues punched out and integrally fixed thereto, anchored in the body and forming an attaching lug for the shoe.

14. In a brake shoe a malleable backing therefor having the integral punched-out and upturned lips 17, bent to incline toward each other but not touching, and perforated to receive the brake shoe key.

15. The combination with the brake head, of a brake shoe having an attaching lug formed of two resilient lips, whereby the attaching lug may be sprung into the opening in the brake head.

16. The combination with the brake head, of a brake shoe provided with a pair of upwardly bent resilient lugs thereon inclined toward each other and adapted to resiliently engage both the sides and the bottom of the notch in the brake head and perforated to receive the brake shoe key, substantially as described.

17. In a brake shoe the combination of the cast body, the malleable back therefor, the attaching lug formed of the two punched out and upturned lips 17 said lips being inclined toward each other and having turned over ends 17ª to engage the bottom of the notch in the brake head, substantially as described.

In testimony whereof I have hereunder signed my name in the presence of the two subscribed witnesses.

FITZ WILLIAM SARGENT.

Witnesses:
W. C. CHIPPS,
H. A. CASTOR.